United States Patent [19]

Gregor et al.

[11] Patent Number: 4,596,858
[45] Date of Patent: Jun. 24, 1986

[54] SOLID STATE CROSS-LINKED POLYMER

[76] Inventors: Harry P. Gregor, 410 Riverside Dr., New York, N.Y. 10025; Edgar Samuelsen, 348-68 St., Brooklyn, N.Y. 11220; Paul I. Dalven, 914 Montgomery St., Brooklyn, N.Y. 11213; Charles D. Gregor, 530 W. 113 St., New York, all of N.Y. 10025

[21] Appl. No.: 622,417

[22] Filed: Jun. 20, 1984

Related U.S. Application Data

[63] Continuation of Ser. No. 325,803, Nov. 27, 1981, abandoned.

[51] Int. Cl.$^4$ .................................................. C08F 8/00
[52] U.S. Cl. .............................. 525/328.2; 525/328.5; 525/329.4; 525/329.5; 525/330.3; 525/384; 525/56; 525/107; 525/116
[58] Field of Search ..................... 525/116, 384, 328.2, 525/328.5, 328.8, 329.4, 330.3, 329.5; 526/287

[56] References Cited

U.S. PATENT DOCUMENTS

| | | | |
|---|---|---|---|
| 3,215,659 | 11/1965 | Spaulding | 525/217 |
| 3,245,932 | 4/1966 | Glavis | 524/249 |
| 3,336,259 | 8/1967 | Zimmerman | 525/384 |
| 3,350,368 | 12/1967 | Krämer | 525/384 |
| 3,483,172 | 12/1969 | Shibukawa | 526/287 |
| 4,239,671 | 12/1980 | Fink | 526/303 |
| 4,374,958 | 2/1983 | Barnabeo | 525/384 |

*Primary Examiner*—Christopher A. Henderson
*Attorney, Agent, or Firm*—Sprung Horn Kramer & Woods

[57] ABSTRACT

Cross-linked polymeric gels or films are prepared by dissolving in a suitable solvent a linear polymer or polymers containing pendant amidocarbonyl or oxycarbonyl groups, hydroxyl groups present as either pendant groups from the polymer or as a low molecular weight polyol, and a strongly acidic catalyst (which may also be a pendant group on a polymer). The solvent is removed by coagulation and/or drying and the dry material is heat-cured, thus cross-linking and insolubilizing the polymer or polymers.

5 Claims, No Drawings

SOLID STATE CROSS-LINKED POLYMER

This is a continuation of application Ser. No. 325,803, filed Nov. 27, 1981, now abandoned.

BACKGROUND OF THE INVENTION

The present invention relates to novel solid polymeric compositions, their preparation and cross-linking, and their uses.

A well-established method for improving the physical properties and solvent resistance of linear polymers is cross-linking, in which the individual polymer chains are joined at many points to yield an interconnected network. The cross-links may be ionic in character, as in complexes of poly-acids with poly-bases, but covalent or chemical cross-linking is stronger, more resistant to hydrolysis, and more versatile in its applications.

The most common way of achieving covalent cross-linking is to use a polyfunctional monomer in the polymerization reaction itself (e.g. divinylbenzene together with styrene). Since cross-linked polymers cannot be dissolved, melted or cast, the polymerization must be carried out in the final physical shape required. Problems often arise in the preparation of films and membranes when catalysts must be introduced or inhibitors such as oxygen excluded from the polymerization reaction. Furthermore, the monomers themselves are often too toxic, volatile, or fluid to be conveniently processed in this manner. All of these factors make the manufacturing process difficult and costly.

It is thus often preferable to prepare a linear polymer or polymers, dissolve them in an appropriate solvent, spray or cast in the final form required, and only then introduce the cross-links. A familiar example of such post-cross-linking is the vulcanization of rubber, in which linear polyisoprene is mixed with sulfur, molded, and then heat-cured. Another example is the cross-linking of various unsaturated polymers by light to produce plates for photoengraving.

Although many polymers will form loosely cross-linked gels upon heating, the mechanism is often obscure and the cross-linking difficult to predict or control. The present invention provides a post-cross-linking method unique in its mechanism, in the range of polymers to which it applies, and in its practicality and wide range of application. It is believed to proceed via the alcoholysis of pendant amide or ester groups on the polymer to produce a new ester linkage between polymer chains. Alcoholysis of amides and esters is a well-known reaction in the organic chemistry of small molecules, where it generally is run in solution at reflux temperature with strong acid or base catalysis. It is one of several mechanisms postulated by Kopecek and Bazilova to account for unusually high molecular weights obtained in solution polymerization of N-(2-hydroxypropyl)methacrylamide (European Polymer Journal, 1973, vol. 9, pp. 10-11.) These authors considered only the possibility of dimerization, not actual cross-linking, and did not report any insolubilization taking place. The unusual feature of the alcoholysis reactions described in this invention is their occurrence in the solid state in the absence of solvent, a phenomenon entirely unexpected and heretofore unreported.

The novel post-cross-linking techniques taught by this invention have many unique advantages, particularly in the manufacture of synthetic membranes. Conventional membranes for reverse osmosis (RO) and ultrafiltration (UF) are made of polymers that are insoluble in the fluid acted on by the membrane (water, in most cases). Typically, a linear polyamide, polysulfone, or cellulose acetate is cast from an organic solvent and coagulated in water. Although such membranes are rigid and physically strong, they are hydrophobic in nature and tend to foul through adsorption of hydrophobic particles and solutes in the feed stream. Such fouling is a major problem in industrial use of membranes, making frequent cleaning or costly pretreatment necessary.

Although hydrophilic polymers, particularly highly sulfonated ones, have been shown to resist such adsorptive fouling, they either dissolve in water or form a soft gel. Useful membranes may be formed of such polymers only by a high degree of cross-linking, so they swell not more than 3-5 times by weight when soaked in water. Since the pore structure of such membranes is generally created by coagulation and since monomers are essentially uncoagulable, the only practical route is post-cross-linking of the coagulated linear polymer. Using the techniques taught by this invention, highly cross-linked UF membranes of controlled porosity may be cast from very hydrophilic polymers. The intricate pore structure of a coagulated membrane is preserved by solid state post-cross-linking. Furthermore, charged functionalities such as sulfonate or quaternary ammonium may be incorporated to yield a cross-linked interpolymer membrane of the type described by Gregor (U.S. Pat. No. 3,808,305), where the fixed charges serve to reject charged colloidal particles and, to some extent, dissolved salts.

The teachings of this invention are applicable to the preparation of virtually all known kinds of polymer membranes. For example, conventional RO membranes tend to suffer compaction or swelling over a period of time and are highly susceptible to biological and chemical attack (particularly chlorination). The tight cross-linking made possible by the teachings of this invention provides physical strength and mitigates the effect of polymer chain scission, thus enabling RO membranes to keep their selectivity under conditions of use. Furthermore, one may prepare an RO membrane with a hydrophilic, non-fouling coating, thus reducing the need for pretreatment of the feed stream.

Conventional electrodialysis (ED) membranes contain a small percentage of charged groups fixed inside the pores of a hydrophobic polymer matrix. Using the teachings of this invention, ED membranes with very high fixed charged densities, tight pore structures and low swelling may be prepared at low cost. Membrane permeation (MP) or pervaporation requires an extremely thin film which selectively adsorbs one component of the feed stream without irreversible swelling or shrinking. The teachings of this invention allow one to incorporate any of a wide range of polymers with different chemical affinities into a film whose swelling is determined by the degree of cross-linking. Solvent extraction membranes must similarly resist excessive swelling but with controlled porosity, and these techniques are again applicable. Finally, the wide range of functional groups compatible with this method of post-cross-linking allows for unusual versatility in the preparation of porous, coagulated membranes for enzyme coupling.

The teachings of this invention enable one to make a wide range of novel and highly useful adhesive coatings. Cross-linked coatings have long been known to exhibit superior strength and solvent resistance, but their preparation generally involves either photolytic curing (as with paints) or noxious chemical monomers (as with epoxies). The present invention allows a viscous solution of a polymer and relatively innocuous cross-linking agents (which may be incorporated in the polymer) to be applied to a surface and cured by heat in a relatively short time. Polyacrylamide and its homologs may be cast into thin films suitable for electrophoresis. Coatings containing highly sulfonated polymers are anti-fouling, non-thrombogenic, and resist the adhesion of micro-organisms. They are thus useful for such purposes as coating heat exchangers, artificial heart valves, ship bottoms, and screens for suspended solids removal. It is also possible to make solid gels according to the teachings of this invention which combine high water content, high physical strength, biocompatibility, and resistance to biocontamination with optical clarity, making them ideal for long-wearing contact lenses and other devices used in eye care.

SUMMARY OF THE INVENTION

In accordance with the present invention, we have found that substantially improved cross-linked gels in the form of membranes, coatings, and formed objects can be prepared from a solution of a linear polymer or polymers containing pendant amidocarbonyl or oxycarbonyl groups, hydroxyl groups present as either pendant groups from the polymer or as a low molecular weight polyol, and a strongly acidic catalyst (which also may be a pendant group from the polymer). After removal of the solvent by drying or coagulation followed by a high temperature cure, some of the amidocarbonyl or oxycarbonyl groups are alcoholyzed to form ester linkages that cross-link and insolubilize the gel. This invention allows one to make membranes, films and solid gels of excellent strength, controlled pore size, and controlled swelling which may incorporate a wide variety of fixed charges and other functionalities.

DETAILED DESCRIPTION OF THE INVENTION

As noted above, the cross-linking reactions described in this invention require the presence of the following functionalities: pendant amides or esters, alcohols, and (in most cases) a strong acid. The alcohol is either itself a pendant function on the polymer (e.g. hydroxyhexyl acrylamide copolymers) or a low molecular weight polyol (e.g. glycerol or pentaerythritol). The alcohol should be primary or secondary to avoid the side reaction of elimination, and should be non-volatile and slow to decompose under the conditions of the high temperature cure. The hydroxyl groups may also be present in an incipient form such as epoxy. It is of course possible to run an inverse reaction with a low molecular weight bis-amide or bis-ester cross-linking a polymer which pendant alcohol groups, but no advantage is obtained and the resins tend to show less hydrolytic stability than those resulting from the normal cross-linking reaction.

The reaction is greatly facilitated by acid catalysis, although a few polymers such as polyacrylamide cross-link adequately in its absence. The acid should be a strong acid, non-volatile and non-oxidizing. It may be pendant as in poly(3-sulfopropyl acrylate) or a separate low molecular weight molecule. Methanesulfonic acid is ideal for this purpose, but any similar strong mineral or organic acid may be used. At least 0.1 mole acid catalyst per mole of the cross-linking alcohol functionality should be used, although no advantage is obtained by exceeding a 1:1 ratio. If the acid catalyst is a pendant functionality on the polymer, improved cross-linking results when an additional low molecular weight acid is used as well, presumably on account of its ability to become localized at the reactive sites.

Any long-chain molecule with pendant amidocarbonyl or oxycarbonyl groups is suitable for cross-linking under the teachings of this invention as long as it is stable under the conditions of the high-temperature cure. The most common and practical of these are N-substituted polyacrylamides and polymethacrylamides, esters of polyacrylic acid and polymethacrylic acid, and homologs of these polymers:

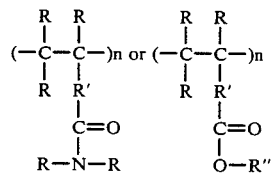

in which:
R each independently is hydrogen, or an alkyl or aryl radical with up to 10 carbon atoms,
R' is either absent or is an alkylene or arylene radical with up to 10 carbon atoms, and
R" is an alkyl radical with up to 10 carbon atoms.

Alkyl substituents on the polymer backbone are thus permissible (e.g. polyethacrylamides or poly(2-propylacrylates) and the amidocarbonyl or oxycarbonyl functionality may be suspended from the polymer backbone by one or more methylene units as in amides or esters of poly(3-butenoic acid). Such monomers and polymers are not readily available, however, and offer no advantages. As far as can be determined from disparate, swelling data, the acrylamides cross-link more readily than the acrylates and either cross-links more readily than its 2-methyl analogue.

A wide variety of functional groups may be present on the alkyl N-substituents of polyacrylamides or the alcohol moiety of polyacrylate esters. Polyacrylamides may have one, two, or no N-substituents. One notable restriction involves the presence of a positive charge near the amidocarbonyl functionality in N-substituted polyacrylamides. Since a positive charge is presumably developed at that site in the course of the reaction (appearing ultimately on the protonated amine byproduct), a second positive charge fixed nearby inhibits the cross-linking of such polymers. In the corresponding polyacrylate esters the byproduct is a neutral alcohol and such polymers can in fact be cross-linked successfully. It should be noted that physical properties such as hydrophilicity may be affected by the replacement of pendant functional groups with a polyhydroxyl alcohol such as glycerol or pentaerythritol. Indeed, a monofunctional alcohol may be grafted onto a polymer by the present method, yielding a linear polymer with altered solubility.

A major advantage of the new cross-linking method is its occurrence in the solid state in the absence of solvent. The polymer chains lie entangled and in close proximity at the time of cross-linking, and therefore form a tight concatenated network that swells little in solvent. A consequence is the need to have good compatibility on a molecular level of all polymers and low molecular weight species in the solid state. If the catalyst or cross-linking agent gets excluded from the polymer while drying the reaction cannot be successful. If a matrix polymer phase-separates it cannot increase strength and reduce swelling as it ought. The rate and manner of drying affect the chain proximity. A polymer dried in an expanded state (e.g. freeze-dried) is unlikely to cross-link satisfactorily. Since the cross-linking reaction welds the polymer chains into what is in effect a single molecule, the molecular weight of the polymer is relatively unimportant. Very low MW polymers (<50,000) tend not to be highly entangled in the solid state and give loose, highly swollen gels.

Other factors influence the tightness of cross-linking under the teachings of this invention. The mole percent of cross-linking agent added or of cross-linkable pendant amide or ester groups in a copolymer is of obvious importance. As little as 0.1 mol % cross-linking agent or moiety (relative to the polymer's monomer content) can insolubilize a polymer as a very loose gel, while any in excess of 50 mol % can in principle no longer find reactive sites on the polymer. The longer the cure and higher the temperature, the more effective the cross-linking. No advantage is obtained by curing longer than three hours at 150° C., while the lower limit is one hour at 120° C., although some insolubilization has been observed at lower temperatures.

The examples given below consist of monomer preparations, homopolymerizations, copolymerizations, cross-linking of polymer films and resins, and the casting and testing of membranes. The polymerizations given in the examples yield polymers of approximately the same molecular weight and comonomer composition as those called for in the cross-linking and membrane examples. Where differences occur, the polymerization procedures may readily be modified according to principles well known to those skilled in the art. For example, molecular weight may be increased by using less catalyst or decreased by adding an appropriate chain-transfer agent such as isopropanol. Since the reactivity ratios in almost all of the copolymerizations are comparable, the comonomer composition may be changed by appropriate adjustments in the initial amounts of the monomers. Where molecular weights are given, they were determined by either viscometry or gel permeating chromatography. Where no molecular weight standards exist, estimates were made based on the viscosity or gel permeation volume of similar known polymers. Since molecular weight may be varied by a factor of at least two without altering the results, the difference between weight and number averaging is insignificant.

All solutions of polymers were prepared on a weight-/volume basis, with the total solute concentration given as percent by weight. The ratio of various solutes to each other is given as parts by weight. Concentrations of low molecular weight compounds are also given as mol % relative to the monomer units making up the polymer(s) in solution. All solvents are reagent grade, but in many cases practical or even commercial grades may be substituted. All water used as a solvent or reagent in the examples is distilled. All ethanol used is 200 proof. Weight or volume swelling indices refer to the ratio of the weight or volume of the resin swollen with solvent to that when dry. All resins and membranes containing polyelectrolytes were soaked in saturated sodium chloride after heat-curing before being put in distilled water so as to minimize osmotic shock.

The membranes described below are all prepared using similar basic techniques well known to those skilled in the art. Unless otherwise specified, all membranes described in the examples below are cast on Hollytex 3381, a calendered non-woven polyester cloth (Easton-Dikeman Co.) The casting solution is filtered through a coarse glass frit, and any bubbles are then removed by either centrifugation or applying a vacuum. The viscous liquid polymer films are cast using either manually operated knives with fixed or adjustable gate openings (available from Gardner Laboratories) or motorized roller type units routinely used in the paper and coatings industries (available from Talboys Engineering Corp., Emerson, N.J.)

The pure water flux of the membranes is determined by mounting them in a standard ultrafiltration cell (Gelman) filled with prefiltered distilled water, applying 30–100 psi nitrogen pressure, and measuring the volume permeate per unit time. Fluxes are expressed as $\mu$sa, or microns per second atmosphere, and tend to be fairly independent of applied pressure. An approximate idea of pore size is obtained by measuring the percent rejection of the red dye erythrosin from a 15 ppm feed solution. The concentration of the dye (MW 836) is determined photometrically. Membranes of the RO type are tested by applying high pressures (400–800 psi) across the membrane and measuring the rejection of salt via conductivity.

Membrane porosity varies according to a number of factors which must be judiciously varied and controlled in order to obtain a desired value. For uncoagulated membranes the higher the solids content in the casting solution and the wider the gate opening on the casting knife, the more polymer deposited and the lower the flux. Slow evaporation of the solvent and a high degree of cross-linking produce non-porous gels with little swelling and low flux.

The flux of coagulated membranes depends on the fineness of the pore structure, which depends in turn on the speed of coagulation. A highly porous support such as Hollytex 3329 allows rapid attack on the cast film from both sides and results in larger pores. Membranes cast on dense supports such as Hollytex 3396, glass of Mylar tend to have much lower fluxes. Wetting a porous support with the coagulating solvent causes some immediate coagulation upon casting and higher ultimate flux. The higher the temperature of the coagulating bath, the higher the flux, and where coagulation is slow, a longer residence time helps ensure complete extraction of the casting solvent. Allowing the cast film to partially dry before coagulation results in a finer pore structure on top and lower flux. If a coherent skin is allowed to form, a low-flux membrane of the Loeb-Sourirajan type is obtained.

The most reliable way of controlling porosity is by increasing or decreasing the solids content of the casting solution. High solids films coagulate more slowly and leave behind a denser pore structure. The higher the molecular weight of the polymer, the lower the solids content possible without changing the viscosity, and the higher the potential flux. There is generally a minimum MW below which coagulation is poor and a maximum above which the solids content must be too low to give a coherent film structure. The polydispersity of the polymer should not be too high or the low MW "tail" will cause anomalous coagulation. Tight cross-linking of hydrophilic coagulated membranes keeps the pores from swelling closed when the membrane is put in water and thus improves the flux.

GLOSSARY

The following abbreviations are used in the examples given below.

DES is diethylsuccinate, El Paso Products Co.
DMAC is dimethyl acetamide, Aldrich.
DMF is dimethylformamide, Fisher.
TCE is sym. tetrachloroethane, Fisher.
THF is tetrahydrofuran, Fisher.

A number of monomers are listed below, designated by the abbreviations used in the examples. Some are from the commercial sources specified, and the remainder have their preparations and physical properties given in the examples.

AMPS is 2-acrylamido-2-methylpropane sulfonic acid, Lubrizol Corp., Special Reaction Grade.
DNBAM is N,N-di-n-butylacrylamide, described herein.
HEA is hydroxyethyl acrylate, Pfaltz and Bauer.
HHAM is N-(6-hydroxyhexyl acrylamide), described herein.
MAPTAC is methylacrylamidopropyltrimethylammonium chloride, Texaco Chem.
NBAM is N-n-butyl acrylamide, described herein.
NBMAM is N-n-butyl methacrylamide, described herein.
SEM is 2-sulfoethyl methacrylate, Dow Chem.
SPA(Na) is 3-sulfopropyl acrylate, sodium salt, described herein.
SSA(K) is styrenesulfonic acid, K+ salt, described herein.
TMEAC is trimethylaminoethylacrylate chloride, Monomer-Polymer.

Some of the polymers employed in the practice of this invention were prepared as described in the following examples, and are abbreviated by preceding the monomer name with a letter P. Others are commercially available materials from the suppliers indicated below.

Kynar is polyvinylidene fluoride, Pennwalt Corp., Grade 301 of MW 375,000.
PAM is polyacrylamide, American Cyanamid, Cyanamer P-250, MW 5,000,000.
PAN is polyacrylonitrile, DuPont, Neutral Modified Type A.
PSSA is polystyrenesulfonic acid, available from National Starch and Chem. of MW 70,000, and prepared as described herein.

In addition, several other commercially available substances were employed:

AIBN is azobisisobutylnitrile, Eastman.
DNPD is N,N-di-2-naphthyl-p-phenylenediamine, Pfaltz & Bauer.
EPON 1031 is a tetrafunctional epoxide resin, Shell Chem.
Molecular Sieves is a drying agent with nominal 3 or 4 Angstrom pores, Davison Division of Grace Chemical.
MSA is methanesulfonic acid, Fisher.
Witcamide 511 is an emulsifying agent, Witco Chem.

EXAMPLES

EXAMPLE 1

Preparation of N,N-di-(n-butyl)acrylamide (DNBAM)

In a 2 liter 3-necked flask were combined 129 g (1 mol) di-(n-butyl)amine (Fisher Scientific) and 0.1 l dry toluene and cooled to 5° C. 46 g (0.5 mol) acryloyl chloride dissolved in 50 ml toluene were added slowly so the temperature remained below 10° C. After the addition the flask was warmed to 25° C. and the precipitate removed by filtration. 1 g DNPD was added, and after concentration on a rotary evaporator the product was distilled at 20 m torr and 61°–63° C. Yield 77 g (84%).

EXAMPLE 2

Preparation of N-(6-hydroxyhexyl acrylamide) (HHAM)

150 g 6-aminohexanol (Pfaltz & Bauer) was distilled, ground, and dried overnight under vacuum. 1 liter dry THF was added at 40° C. and the solution cooled to 10° C., causing partial precipitation. 52 ml (57.9 g) acryloyl chloride was dripped in with stirring at 10°–15° C. over a period of 2.5 hours, with 200 ml additional THF added after 2 hours.

The white precipitate of aminohexanol hydrochloride formed was filtered, washed with 100 ml THF and then stirred with 300 ml THF. The latter portion of THF was filtered, treated with 5 grams silica gel, and refiltered into the main portion of the solution. Then 1 g hydroquinone was added and the THF solution evaporated under vacuum to an oil. Recrystallization from 500 ml ethyl acetate yielded 79.4 g of a white crystalline product. The mother liquor was evaporated and recrystallized from 75 ml ethyl acetate to yield an additional 4.0 g of product, m.p. 57.5°–58.5° C.

EXAMPLE 3

Preparation of N-n-butyl acrylamide (NBAM)

146 g of n-butylamine (dried over 4 A Molecular Sieves) was dissolved in 1 liter of toluene (dried over calcium hydride) in a 2 liter 3 necked flask equipped with an ice-acetone bath, a mechanical stirrer, a thermometer and a dropping funnel. The solution was stirred and cooled to 0° C. 90.5 g distilled acryloyl chloride dissolved in 100 ml dry toluene was added slowly so that the temperature did not go above 10° C. After addition, the solution was allowed to come to room temperature and was then filtered through medium porosity filter paper. Then 1.5 g of the nonvolatile inhibitor DNPD was added and the solution concentrated on a rotary evaporator. Distillation at 0.05 torr and 85° C. yielded 115 g, a yield of 90.5%.

EXAMPLE 4

Preparation of N-n-butyl methacrylamide (NBMAM)

In a 1 liter 3-necked flask were combined 400 ml dry THF and 40 ml distilled n-butylamine (0.405 mol). After cooling to 5° C. in an ice bath, 20 ml (0.205 mol) methacryloyl chloride was added slowly so as to keep the temperature below 10° C. The precipitate was removed by filtration, and the filtrate concentrated on a rotary evaporator. 1 g DNPD was added and the oil distilled at 76°–78° C. and 20 m torr. Yield 24.3 g (84%).

EXAMPLE 5

Preparation of 3-Sulfopropyl acrylate, Na salt (SPA(Na))

19 g sodium acrylate, 7.5 g acrylic acid, 60 ml tert-butanol, and 0.1 g p-methoxyphenol were heated to reflux in a 500 ml 3-neck flask. 25 g propanesultone (Aldrich) was added dropwise over a period of 2 hours, with more tert-butanol added as needed to maintain stirring. The precipitate was collected by filtration and vacuum dried to yield 40 g product.

EXAMPLE 6

Preparation of SSA(K)

In a three liter 4-necked flask were combined 372 g (2.0 mol) 2-bromoethyl benzene (RSA Corp) and 1350 ml 1,2-dichloroethane, both having been dried over 4 Å Molecular Sieves. The flask was warmed to 60° C. and flushed with nitrogen. 240 g (2.07 mol) chlorosulfonic acid (Eastman) dissolved in 50 ml 1,2-dichloroethane was added dropwise with rapid stirring. Stirring was continued at 60° C. until no additional hydrogen chloride was evolved. A partial vacuum was applied to remove residual HCl, and the flask was chilled to 10° C. A chilled solution of 135 g KOH in 750 ml distilled water was added, and the flask cooled to 0° C. The precipitate was collected using a Buchner funnel cooled with ice water, and then dried under vacuum to yield 440 g crude product. This was dissolved in a solution of 95 g 86% aqueous KOH and 750 ml distilled water, warmed to 65° C., and filtered through a heated Buchner funnel. The filtrate was cooled slowly to 5° C., and the precipitate was collected and dried as before. Yield 300 g (67%).

EXAMPLE 7.

Preparation of Poly(2-acrylamido-2-methylpropane sulfonic acid) (PAMPS)

50 g of AMPS was dissolved in 100 ml of distilled water and then purged 30 min with nitrogen at ambient temperature. 3.2 mg potassium peroxydisulfate dissolved in 1 ml water was added, purging continued for 10 minutes, and the container sealed and allowed to stand at 40° C. for 16 hours. The polymer was isolated by diluting to less than 10% solids and freeze-drying.

EXAMPLE 8

Preparation of Poly(methylacrylamidopropyltrimethylammonium chloride) (PMAPTAC)

Here, 100 g of a 50% (w/w) solution of MAPTAC in water was warmed with 2 g activated charcoal, stirred and filtered. The solution was purged with nitrogen for 15 min and warmed to 40° C. under nitrogen. A solution of 100 mg ammonium peroxydisulfate in 1 ml water was added, followed by a solution of 10 mg sodium metabisulfite in 1 ml water. The solution was stirred at 40° C. under nitrogen until its viscosity increased significantly, and then covered and set in an oven at 60° C. for 1 hour. The polymer was isolated by drying in a vacuum oven or diluting to 500 ml with water and freeze-drying. Its intrinsic viscosity was 769 ml/g for a 0.1% solution in water at 25° C.

EXAMPLE 9

Preparation of Poly(N-n-butyl acrylamide) and Poly(N-n-butyl methacrylamide) (PNBAM and PNBMAM)

Distilled NBAM was extracted with 0.1N sulfuric acid, washed with saturated sodium sulfate, dried over anhydrous sodium sulfate and filtered. Then 40 g was combined with 80 ml degassed, distilled water and 1.2 g sodium lauryl sulfate to yield a mixture of pH 4.0. The mixture was heated to 40° C. with stirring and nitrogen was bubbled through for 30 minutes. Then 50 mg of ammonium peroxydisulfate was added dissolved in 1 ml water. A latex formed within 10 minutes and polymerization was continued overnight. Ethanol was added to the latex to coagulate the polymer, which was then dissolved in 500 ml ethanol, precipitated into distilled water in a blender, and dried overnight under high vacuum to yield 32.2 g polymer.

The polymerization of NBMAM proceeds exactly the same way, with the n-butyl methacrylamide monomer substituted and the reaction run at

EXAMPLE 10

Preparation of Poly(N,N-di-n-butylacrylamide) (PDNBAM)

75 g of DNBAM monomer were combined with 375 ml distilled water, 8 g sodium lauryl sulfate, and 100 mg ammonium peroxydisulfate and the pH adjusted to 4.0 with phosphoric acid. It was stirred with nitrogen bubbling through at 60° C. for 18 hrs. The polymer was coagulated with methanol and blended with water to remove detergent and harden the polymer. It was dried under vacuum. Yield, 64 g.

EXAMPLE 11

Preparation of Poly(2-sulfoethyl methacrylate) (PSEM)

A 30% solution in water of the SEM monomer was purged with nitrogen bubbling, then polymerized with the addition of 0.2% w/w (relative to the monomer) of ammonium peroxydisulfate at 50° C. for 16 hours. The solution was passed through a weak base ion-exchange column (Rohm & Haas IRA 60) to remove residual monomer and then freeze-dried. The molecular weight was estimated at 100,000 by viscometric comparison with similar known polymers.

EXAMPLE 12

Preparation of Poly(3-sulfopropyl acrylate) (PSPA)

To 20 ml water purged with nitrogen was added 10 g SPA(Na) with stirring. The solution was warmed to 50° C., 1.0 mg ammonium peroxydisulfate was added, and the solution left covered in a 50° C. oven overnight. The solution was diluted to 5% solids, freeze-dried, re-dissolved to 5% solids in water, and acidified by passage through a strong acid ion-exchange column (Amberlite 200, Rohm & Haas). The polymer was recovered by freeze-drying the diluted solution.

EXAMPLE 13

Preparation of Poly(styrene sulfonic acid) (PSSA)

In a 500 ml 3 necked flask were combined 180 g xylene, 20 g Witcamide 511 and 40 mg AIBN, and warmed to 55° C. under nitrogen. Stirring was maintained at 450 rpm using a stirring blade which largely filled the flask. The monomer charge of 30 g potassium styrene sulfonate in 90 ml water was added dropwise (0.5 ml/min), and the reaction continued for 72 hrs. The emulsion was broken by pouring into 1 liter of acetone. The precipitate was removed, blended with 1 liter of acetone, filtered and dried, yielding 31.6 g. This was dissolved in 600 ml water and precipitated into 1.3 liters absolute ethanol in a blender. The supernatant solvent was discarded and replaced by 1.5 liters absolute ethanol, which was blended until a finely divided material was obtained. This was filtered and dried yielding 21 g. Its MW was determined to be about 2 million by comparison with sulfonated polystyrene standards using gel permeation chromatography. The polymer was dissolved in water to 5% solids, converted to the acid on a strong acid ion exchange column (Amberlite 200, Rohm & Haas) and then freeze-dried.

EXAMPLE 14

Preparation of Poly(trimethylaminoethylacrylate chloride) (PTMEAC)

20 g of a 40% aqueous solution of TMEAC was treated with 1 g activated charcoal for 20 min and filtered. The filtrate was purged with nitrogen, 5 mg ammonium peroxydisulfate was added, and the solution was left overnight at 50° C. The polymer was precipitated with acetone, filtered, and dried, yielding 6 g (75%).

EXAMPLE 15

Preparation of P(AMPS-HHAM), 9:1 Copolymer 67.5 g AMPS, 6.14 g HHAM, and 300 ml water were combined in a 500 ml resin kettle fitted with a heating mantle, cooling coil, thermometer, overhead stirrer and fritted gas bubbler. Nitrogen was bubbled though the solution for one hour while the temperature was maintained at 58° C. Then, 35 mg ammonium peroxydisulfate and 15 mg sodium metabisulfite were each dissolved in 6 ml of degassed distilled water, and 2 ml of the peroxydisulfate solution was added to the kettle followed by 2 ml of the metabisulfite solution. The addition of 2 ml aliquots was repeated for 1.5 minutes and 5.5 minutes while the temperature was maintained as near 58° C. as possible.

After 1 hour, 300 ml distilled water was added and the viscous solution freeze-dried at −20° C. The resulting polymer had an inherent viscosity of 227 ml/g when measured as a 0.5% solution in 3% NaCl.

EXAMPLE 16

Preparation of P(NBAM-HEA), 9:1 Copolymer

For a 10 mol % copolymer, the inhibitor in the HEA monomer was removed by dissolving 1.79 g (0.0154 mol) of HEA in 13 ml water and treatment with activated charcoal followed by filtration. This was combined with 40 ml methanol, 17.67 g NBAM (0.139 mol) and 90 mg AIBN. The polymer was isolated by addition of water in a blender followed by filtration and drying under vaccum at 45° C. The yield was 17.2 g (88%).

EXAMPLE 17

Preparation of P(AMPS-SSA), 1:1 Copolymer 22 g of the sodium salt of AMPS and 24 g of SSA(K) (Fluka) were combined with 80 g water and purged with nitrogen at 40° C. 3 mg ammonium peroxydisulfate was added and purging was continued until the start of polymerization. The container was covered and left at 40° C. for 18 hours. Gel permeation chromatography revealed considerable monomer remaining. The solution was thus dialyzed against distilled water and the polymer isolated by freeze-drying. Yield 38 g.

EXAMPLE 18

Preparation of P(SSA-HEA), 4:1 Copolymer

In a 500 ml 3-necked flask were combined 130 g xylene and 13 g Witcamide 511 with 15 mg AIBN and then stirred at 50° C. under nitrogen. An aqueous phase was prepared by combining 21.5 g potassium styrene sulfonate, 65 ml water and 2.8 g HEA with charcoal and filtering. This was added dropwise (about 0.5 ml/min) to the xylene phase with stirring at 450–500 rpm. After 48 hrs the polymer was isolated by pouring into 1 liter absolute ethanol in a blender, decanting the solvent and reblending with 700 ml ethanol. The yield was 15.4 g. Gel permeation chromatography showed the MW to be about 900,000.

EXAMPLE 19

Cross-linking of Polyacrylamide

To a 5% solution of 5,000,000 MW PAM in water was added 2.5 mol % of glycerol. The clear solution was dried in an aluminum dish at 60° C. and then cured for 3 hours at 140° C. After soaking in water at 80° C. for several hours the gel swelled slightly and was quite firm. When the preparation was repeated with 10 mol % glycerol, a hard, slippery gel was formed. When 50 mol % glycerol and 50 mol % MSA were used, the resulting gel appeared no different from the one made with 10 mol % glycerol alone.

EXAMPLE 20

Cross-linking of PNBAM and PNBMAM 1.50 g PNBAM was dissolved in a solution with 0.11 ml glycerol and 0.34 ml MSA in 28.5 ml absolute ethanol. The viscous solution was poured to a thickness of 1 mm on an aluminum sheet, dried 30 min at 60° C., and then cured 3 hours at 140° C. The film was soaked in ethanol for a week, and its weight swelling index was found to be 4.5 in that solvent.

In a second experiment, 1.50 g PNBMAM was dissolved in a solution of 0.12 ml glycerol and 0.38 ml MSA in 13.5 ml ethanol. The solution was dried and cured as above, giving a film with a weight swelling index of 4.5 in ethanol.

In a third experiment, three solutions of PNBAM were prepared, each 8% in ethanol. The first contained no cross-linking agents, the second contained 3 mol % each of glycerol and MSA, and the third contained 20 mol % each of glycerol and MSA. Each solution was cast at a thickness of 7 mils on a film of carboxymethylcellulose laid over glass, dried at 60° C., and cured at 140° C. for three hours. After soaking in distilled water for nine days the water contents by weight were determined: uncrosslinked-12.9%; 3% cross-linking—12.5%; 20% cross-linked—30% water content.

EXAMPLE 21

Cross-Linking of PDNBAM; Comparison with PNBAM

To a 5% solution of PDNBAM in 1:1 phenol:TCE was added 40 mol % each of MSA and glycerol. A similar solution was prepared of PNBAM. Each clear solution was poured into an aluminum dish, dried at 60° C. and cured 3 hrs at 140° C. When 1:1 phenol:TCE solvent was added and the gels stirred overnight at 50° C., neither polymer dissolved. A coherent and strong film structure was observed with PNBAM, while PDNBAM swelled much more and had a loose, gel-like structure.

EXAMPLE 22

Cross-linking of PAMPS

To a solution of 10 g of PAMPS (MW>1,000,000) in 90 ml ethanol was added 0.89 g glycerol (20 mole %). The solution was cast at a thickness of 6 mils onto a glass plate, dried and then cured 3 hours at 150° C. After soaking briefly in saturated sodium sulfate, the film was soaked overnight in distilled water. The resin was firm and highly hydrophilic and swelled so little it did not lift off the plate unless peeled off. When glycerol was omitted from the reaction mixture, the cured film dissolved completely, showing no cross-linking.

EXAMPLE 23

Diol Cross-linking Agents

To 5% solutions of PAMPS in DMF were added 50 mol% of either 1,3-butanediol or 1,4-butanediol, together with 50 mol % MSA. The solutions were dried at 60° C. in aluminum dishes, and then cured at 140° C. for 3 hours. Water was added and the dishes heated at 60° C. for 4 hours with stirring. In both cases the gels were insoluble, coherent films that appeared as firm as when corresponding amounts of glycerol were used.

EXAMPLE 24

Cross-linking of P(AMPS-HHAM)

A 200 mg sample of P(AMPS-HHAM) copolymer of 90:10 mol% composition was dissolved in 2 ml distilled water, dried at 60° C. and then heated 1.5 hours at 150° C. After soaking in saturated sodium sulfate and then in water, a cross-linked resin was obtained with a volumetric swelling index in water of 5.0. The same procedure was repeated except that curing for 2 hrs at 145° C. was used. The swelling index was then 4.7.

EXAMPLE 25

Cross-Linking of P(AMPS-HHAM) with PAN Matrix

A copolymer of 85 mol % AMPS and 15 mol % HHAM was dissolved in DMAC to 10% solids content. To five parts of this solution were added one part of a 10% solution in DMAC of PAN. The final solution was cast at 6 mils onto glass. After drying 30 minutes at 60° C., the film was cured 3 hours at 125° C. After soaking in saturated sodium sulfate, the film was soaked in distilled water. Its lateral swelling was 12.5% and its volumetric swelling index 2.3.

The preceding experiment was performed in the same manner except that a copolymer 20 mol % in HHAM was used. The resulting cross-linked film showed a lateral swelling of 6% and a volumetric swelling index of 2.1.

EXAMPLE 26

Cross-linking of PSPA

A 2% solution of PSPA (MW about 1,000,000) was prepared in water. When samples of this solution were dried at 90° C. and cured at 140° C. for 3 hours, the polymer remained fully soluble in water. When 50 mol % MSA was added, the polymer again did not cross-link, but when 50 mol % MSA plus 50 mol % glycerol were added, the cured polymer was a hard coherent solid which softened slightly in hot water but did not swell perceptibly.

EXAMPLE 27

Cross-linking of PSEM

A 10% ethanolic solution of PSEM was prepared containing 50 mol % each of glycerol and MSA. After drying at 60° C. and curing 3 hours at 140° C., a weakly cross-linked gel resulted. If the glycerol was omitted the cured polymer dissolved in ethanol.

EXAMPLE 28

Attempted Cross-linking of PMAPTAC; Cross-linking of PTMEAC

Two 5% solutions were prepared of PMAPTAC in ethanol at room temperature and in 1:1 phenol:TCE at 75° C. To each was added 50 mol % glycerol and 50 mol % MSA. These solutions were each poured into aluminum dishes, dried at 60° C. and cured at 140° C. for 3 hours. Water, ethanol, and the 1:1 solvent were each added to different samples of the cured resins. In each case the polymer dissolved quickly. It is presumed that the positive charge on the side chains of this N-substituted acrylamide inhibited the cross-linking reaction as discussed above.

To 10 ml of a 5% solution of PTMEAC in water was added 100 mol % of glycerol and 100 mol % of MSA. Drying and then curing at 140° C. for 3 hrs yielded a resin showing little swelling in water. The positive charge on this acrylate side chain apparently did not inhibit cross-linking.

EXAMPLE 29

Cross-linking of P(SSA-HEA)

A 1% aqueous solution was prepared of a copolymer with mole ratio 4:1 of SSA:HEA and molecular weight about 1 million. The solution was divided into three parts. To the first part nothing was added. To the second was added 0.5 mole MSA per mole HEA monomer, and to the third was added 0.5 mole MSA and 0.5 mole glycerol per mole HEA. The samples were poured into aluminum dishes, dried, and cured at 140° C. for 3 hrs. Water was then added to the dishes and they were heated to 60° C. The untreated copolymer swelled to form a weak gel, but would not dissolve. The copolymer treated with MSA formed a somewhat harder gel. The copolymer treated with MSA and glycerol formed a very hard gel that did not appear to swell significantly.

EXAMPLE 30

PAMPS/PAN Thin-Film Composite RO Membrane

A 9% solution of PAN was prepared by heating and stirring the polymer in DMF at 60° C. for several hours. After cooling to room temperature, the clear solution was cast onto Hollytex 3329 using a Gardner knife at 7 mils. The film was immersed in water for 10 minutes to coagulate it, then dried at room temperature. Its initial water flux was 150 $\mu$sa at 50 psi.

A 7% solution in methanol of 1.0 parts of 5 million MW PAMPS and 0.13 parts glycerol was cast 7 mils thick onto the PAN support membrane, dried at 60° C. and cured at 140° C. for 3 hours. The membrane gave a flux of 0.22 $\mu$sa with 76% salt rejection when subjected to a feed solution of 0.02N potassium chloride at 400 psi.

EXAMPLE 31

PNBAM/PAN Thin-Film Composite RO Membrane

A 10% solution of PNBAM in DMF containing 10 mol % each of glycerol and MSA was cast at 8 mils on a PAN support membrane of 1000 $\mu$sa pure water flux. The film was air-dried for 10 minutes, oven-dried at 60° C. for 3 hours, then cured at 140° C. for 5 hours. The membrane was soaked in distilled water 24 hours, then mounted in an RO test cell (Gelman) with a 3000 ppm NaCl feed solution. At 200 psi the initial flux was 0.35 $\mu$sa with 87% rejection, at 400 psi it was 0.14 $\mu$sa at 92% rejection, and at 500 psi it was 0.1 $\mu$sa at 97% rejection.

EXAMPLE 32

Polyacrylamide UF Membrane

A 5% solution of PAM in water was prepared by adding the polymer granules slowly to a blender containing the water and blending at high speed until the solution just began to boil (about 15 min). The blending reduced the inherent viscosity from 3000 ml/g to 2600 ml/g, measured at 25° C. at 0.005% in water. 50 mol % glycerol was added to the blended 5% solution, and it was cast at a thickness of 8 mils on base-treated Hollytex 3396 (soaked 3 days in 3N NaOH). The film was dried at 90° C. and cured 3 hours at 140° C., giving an initial water flux of 340 μsa at 45 psi. When 50 mol % pentaerythritol was substituted for the glycerol, the same flux was observed.

EXAMPLE 33

PAMPS UF Membrane Coagulated in DES

A 3% solution of PAMPS (5 million MW) in 1:1 phenol:TCE was divided into four parts, and 5, 10, 25 and 50 mol % each of glycerol and MSA were added. After casting at 8 mils onto either dense (3396) or medium porosity (3381) Hollytex, coagulating for 2 minutes in room temperature DES, drying and curing for 3 hours at 140° C., followed by soaking in water, the membrane layers adhered strongly to the support and could not easily be rubbed off. All of the membranes were hard, smooth and strongly hydrophilic.

Different mol % cross-linking gave the following pure water fluxes (in μsa): on Hollytex 3318, 5% gave 482, 10% gave 500, 25% gave 580, and 50% gave 675 μsa. On Hollytex 3396, 5% gave 58, 10% gave 58, 25% gave 195, and 50% gave 385 μsa.

EXAMPLE 34

PAMPS-KYNAR UF Membrane Coagulated in DES

A solution 10% solids in DMAC was prepared consisting of 5 parts PAMPS (1 million MW), 1 part Kynar and 0.45 part Epon 1031. It was cast at 7 mils onto Hollytex dampened slightly with DES, then immersed in DES at 80° C. for 20 seconds to coagulate the PAMPS, then dried and cured at 140° C. for 3 hours. The membrane had a flux of 1.5 μsa with 93% dye rejection at 100 psi.

EXAMPLE 35

P(AMPS-HHAM)-KYNAR UF Membrane Coagulated in DES

The same procedure was followed except that the casting solution was 10% in DMAC and consisted of 5 parts P(AMPS-HHAM) copolymer (9:1 mole ratio, 1 million MW) and 1 part Kynar. DES was used for coagulation and the flux was 2.1 μsa with 90% dye rejection at 100 psi. This membrane showed poor stability in base and disintegrated fairly rapidly in a pH 11 buffer. It is postulated that the hydroxyhexyl groups on the polymer reacted with the diethyl succinate coagulation solvent during curing to yield exposed ester linkages that were easily hydrolyzed.

EXAMPLE 36

PSSA-P(NBAM-HEA) UF Membrane Coagulated in DES

A 6% casting solution in DMF consisting of 3.25 parts PSSA of 1 million MW, 1 part P(NBAM-HEA) of 300,000 MW and a 9:1 mole ratio, 0.3 parts glycerol and 0.19 part MSA was cast at 7 mils, coagulated for 2 min in DES at 25° C., and then dried and cured at 140° C. for three hours. This membrane had a flux of 30 μsa at 50 psi.

EXAMPLE 37

P(SSA-AMPS)-PNBAM UF Membrane Coagulated in DES

A solution in DMF having a total solute concentration of 4.5% was prepared by combining 0.8 parts of P(SSA-AMPS) (MW about 250,000; contained 50 mol % AMPS), 1 part of PNBAM having an intrinsic viscosity of 65 in DMF at 25° C., 0.36 part glycerol and 0.38 part MSA. This solution was cast at 5 mils onto Hollytex 3396 and then immediately immersed into DES for two minutes. The membrane was then heated in a 140° C. oven containing vapors of DES for 20 minutes, and then cured by heating in a dry oven for three hours at 140° C. After soaking for 10 minutes in brine, the membrane was washed in water and found to have a water flux of 200 μsa.

EXAMPLE 38

Ultrafiltration of Primary Sewage Effluent

A comparison was made of three membranes used for the UF of primary sewage effluent at 50 psi. The first (A) was a commercially available polysulfone UF membrane made by Osmonics, Inc. (SEPA 20 KPS). Membrane B was cast from a solution composed of 2 parts PMAPTAC, 1 part PNBAM, 0.36 parts glycerol and 0.15 parts MSA, all made up to 3.2% solids in 1:1 phenol:TCE, coagulated in DES, and dried and cured 3 hours at 140° C. Membrane C was identical to B except for the use of 1 part glycerol and 0.19 part MSA in the casting solution, the total solids being 3.7%. The membranes were mounted in rectangular cells with an effective area of 12 square inches and a cross-flow of 100 cm/sec across the membrane surface. After more than 100 days of constant ultrafiltration of primary effluent from the Wards Island (New York City) plant, the fluxes of the three membranes at 50 psi were: A, 1.0 μsa; B, 2.8 μsa; C, 3.2 μsa. The chemical oxygen demand (COD) of the primary sewage feed was 1100 mg/l; that of the permeates averaged only 88 mg/l.

It will be appreciated that the instant specification and examples are set forth by way of illustration and not limitation, and that various modifications and changes may be made without departing from the spirit and scope of the present invention.

What is claimed is:

1. A solid insoluble cross-linked composition produced by solid-state cross-linking at a suitable temperature of a composition formed from a solution of
   (a) at least one polymer consisting essentially of monomer units of the formula

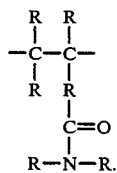

in which each R is independently hydrogen, or an alkyl or aryl radical with up to 10 carbon atoms,
R' is either absent or is an alkylene or arylene radical with up to 10 carbon atoms,
   (b) hydroxyl groups of a low molecular weight polyol, wherein the molar ratio of the monomer units making up the polymer to the total hydroxyl groups range from 1:0.001 to 1:0.4, and (c) a sulfonic acid selected from the group consisting of an alkane sulfonic acid and a benzene sulfonic acid, the composition swelling only slightly in solvents in which the polymer prior to cross-linking is soluble.

2. A composition according to claim 1, wherein the hydroxyl groups are present in the form of at least one of glycerol and pentaerythritol.

3. A film according to claim 1 having a pure water flux of from about 1 to 10,000 microns per second per atmosphere at an applied pressure up to 7 atmospheres.

4. A composition according to claim 3, wherein the hydroxyl groups are present in the form of at least one of glycerol and pentaerythritol.

5. A composition according to claim 4, wherein the hydroxyl groups are present in the form of at least one of glycerol and pentaerythritol.

* * * * *

UNITED STATES PATENT AND TRADEMARK OFFICE
CERTIFICATE OF CORRECTION

PATENT NO. : 4,596,858
DATED : June 24, 1986
INVENTOR(S) : Harry P. Gregor, et al.

It is certified that error appears in the above-identified patent and that said Letters Patent is hereby corrected as shown below:

| | |
|---|---|
| Col. 3, line 57 | After "polymer" delete "which" and substitute --with-- |
| Col. 4, lines 32,33 | After "propylacrylates)" Insert --)-- |
| Col. 6, line 6 | Delete "Easton" and substitute --Eaton-- |
| Col. 6, line 44 | End of line delete "of" and substitute --or-- |
| Col. 8, line 2 | Delete "0.1" and substitute --0.5-- |
| Col. 9, line 13 | Delete "50 ml" and substitute --150 ml-- |
| Col. 10, line 9 | After "run at" insert --50°C.-- |
| Col. 15, line 27 | Delete "3318" and substitute --3381-- |
| Col. 16, line 55 | Delete formula and substitute |

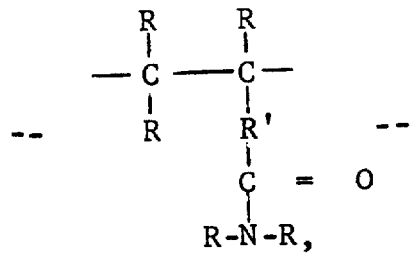

Signed and Sealed this

Twentieth Day of January, 1987

Attest:

DONALD J. QUIGG

Attesting Officer     Commissioner of Patents and Trademarks